(No Model.) 2 Sheets—Sheet 1.
J. H. HENDRICK & A. H. FAY.
BRAKE FOR VELOCIPEDES.
No. 526,317. Patented Sept. 18, 1894.
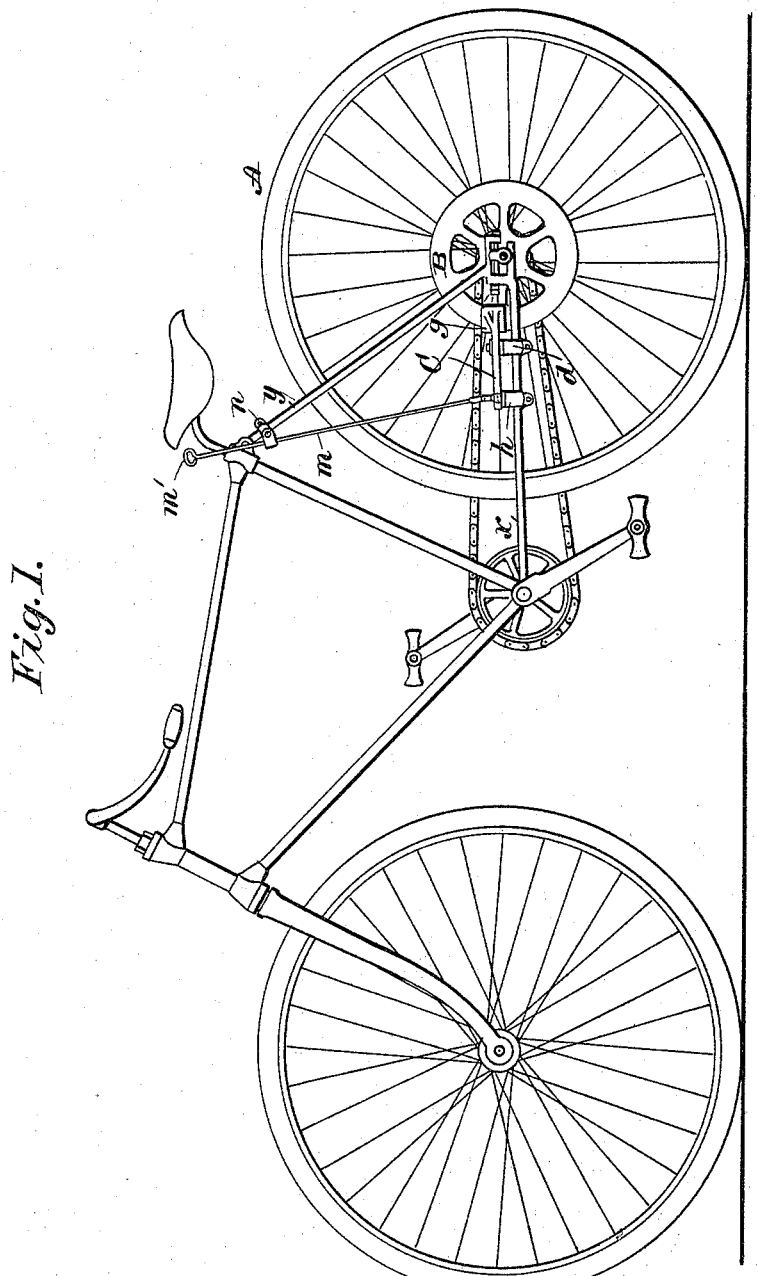
Fig. I.
Witnesses:
J. W. Garfield
K. J. Clemons
Inventors:
Joel H. Hendrick and
Arthur H. Fay.
by Chapin & Co.
Attorneys.

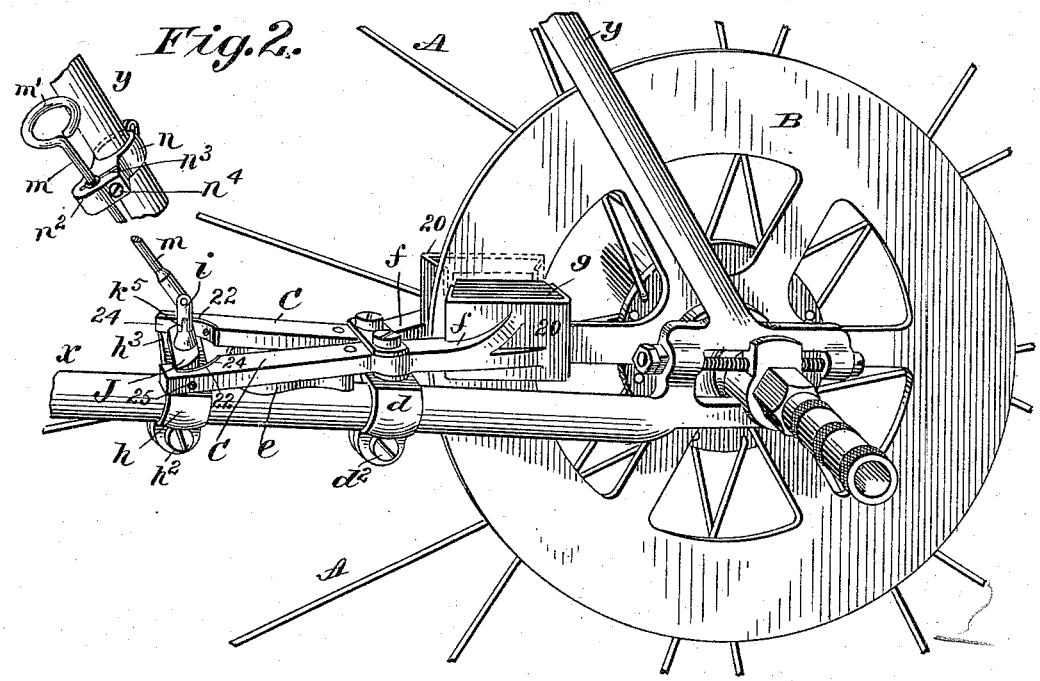

UNITED STATES PATENT OFFICE.

JOEL H. HENDRICK, OF SPRINGFIELD, AND ARTHUR H. FAY, OF CHICOPEE, ASSIGNORS TO THE WARWICK CYCLE MANUFACTURING COMPANY, OF SPRINGFIELD, MASSACHUSETTS.

BRAKE FOR VELOCIPEDES.

SPECIFICATION forming part of Letters Patent No. 526,317, dated September 18, 1894.

Application filed November 4, 1893. Serial No. 489,985. (No model.)

*To all whom it may concern:*

Be it known that we, JOEL H. HENDRICK, residing at Springfield, and ARTHUR H. FAY, residing at Chicopee, in the county of Hampden and State of Massachusetts, citizens of the United States, have invented new and useful Improvements in Brakes for Velocipedes, of which the following is a specification.

The object of this invention is to devise an improved brake mechanism for safety bicycles which shall be advantageous over those heretofore proposed, especially with respect to its efficiency as a coasting brake avoiding the necessity, after the brake is set, of the constant hand pressure to hold it to its braking action,—to the avoidance of any straining effect upon the wheel, or abrasive, or rupturing action upon the tire,—to its availability upon any driving or driven wheel of the vehicle, and by reason of its construction and mode of operation, it is also advantageous in its susceptibility of composition by light and not necessarily strong parts,—all of which will become manifest to persons familiar with bicycles and their manufacture from the accompanying illustrations, in connection with the description hereinafter given.

In the drawings, Figure 1 is a side elevation of a safety bicycle with the improved brake applied thereupon. Fig. 2 is a perspective view on a considerably larger scale showing the brake mechanism and supporting portions of the frame therefor. Fig. 3 is a plan view of the same. Fig. 4 is a vertical cross sectional view taken on the line 4—4, Fig. 3. Fig. 5 is a diagrammatic view illustrating a further modification in the brake operating means.

The brake mechanism relates to the class which comprises, in combination with a disk provided as a rigid part of one of the driven or driving wheels of the velocipede, a lever or levers suitably mounted on the machine for swinging movements, so that a portion of each may have a brake bearing contact upon the face of the disk and means for operating the lever or levers. This brake mechanism may be either permanently, or removably attached and may have the brake disk thereof applied in conjunction with the rear wheel, the front wheel, or the crank and sprocket shaft, as convenience or taste may dictate.

In the illustrations given the brake mechanism is applied for operation at the rear wheel of the bicycle, the operating rod being extended to a place of convenient grasp near the saddle, and in connection with the drawings the devices will now be particularly described.

A represents the rear wheel of a safety bicycle of the most common type with the disk B, formed thereon, or secured thereto, as one therewith. The disk is shown as having the laterally extended hollow hub, $a$, which closely surrounds the ball-case $b$, of the hub of the wheel, A, the attachment of the concentric parts being by means of the screws, $a^2$, indicated in Fig. 3. The said disk may be formed of comparatively thin metal with the axially extended hollow hub, $a$, formed in any practicable manner. Aluminium may be advantageously used to constitute the disk; and again, non-metallic material may be employed, as, for instance, hard vulcanized rubber, or vulcanized fiber.

C, C, represent the brake levers which are mounted to swing, horizontally, upon the lower rear tubular member, $x$, of the frame at one side thereof. As shown these levers are intermediately thereof pivotally mounted upon the detachable clip, $d$, which encircles the frame member and is immovably held by the binding screw, $d^2$. The spring, $e$, operates to swing the levers so that the arms, $f, f$, thereof, which are provided with the brake shoes, $g$, will stand free from the opposite faces of the brake disk. The said arms, $f, f$, having their position at opposite sides of a given point within the edge of the disk, are formed with the dove-tailed sockets or holders, 20, 20, within which are set the bevel edged brake shoes.

The brake shoes may be formed of any suitable material affording a good frictional surface, such, for instance, as vulcanized fiber, wood, hard vulcanized india rubber or gutta percha, or india rubber in any of its suitable elastic or compressible compounds, or leather.

The brake shoes may be secured within the holders, preferably removably, in any suitable manner.

Just beneath the extremities of the brake levers at the farther end from the brake shoes, is another clip, $h$, which is detachably secured by the binding screw, $h^2$, upon the aforesaid frame member, $x$. This clip has its upper portion formed with the horizontal bracket, or shelf, $h^3$.

J represents a bar, or button, which rests upon the said clip bracket between and transversely relative to, the extremities of the brake levers, it being noticed that the said extremities are formed with narrowed extremities, the inner boundaries of which are curved, as seen at 22. The said button, J, is, at its middle, pivotally mounted upon the said bracket, $h^3$, by the stud, $k$, the shank of which passes vertically through the button and clip bracket receiving on its screw-threaded extremity under the bracket the nut, $k^4$. The said stud has the pin, $k^3$, which passes through it and through the button whereby any motion imparted to the stud will correspondingly move the button. The stud has the shoulder, $k'$, above the button preventing any rising of the latter and it also has an ear piece, $k^5$, with which engages the member, $i$, of a universal joint which is provided as the connection between the said stud and the brake operating rod $m$. The pivotal connection which the link member, $i$, has with the stud is at right angles to the line of its pivotal connection with the brake-rod, $m$, as common in universal joints. The ends of the button, J, are eccentric or angular to the pivot point of the button so that when the button is turned the extremities will exert cam, or forcing, actions upon the proximate portions of the brake levers to spread them and bring the brake shoe arms to their brake bearing contact on the disk.

In Figs. 2 and 3 the endwise boundaries of the button are continuous curves, while in Fig. 5 they are shown as rests or facets.

The portions of the brake levers which are contacted upon by the cam acting surfaces of the button, J, are constituted by adjustable sections which may be set up to compensate for the wear of the brake. As particularly shown these adjustable sections are constituted by thin strips, 24, of metal, one end of each of which is screwed, or otherwise secured to the brake lever, the other end portion being backed up by the screw, 25, which, on being inwardly turned, forces the strip slightly toward the face of the opposite lever.

Upon the rear upper diagonal member of the bicycle frame indicated at $y$, there is another detachably connected clip, $n$, with an extension, $n^2$, which is apertured for the passage therethrough of the brake-rod, $m$. This clip extension has the cleft, $n^3$, intersecting the said aperture and the constricting screw, $n^4$, is applied for regulating the bind which there is to be between the brake rod and the boundaries of the aperture through which it passes, all so that whatever movement the rod has is against the frictional resistance at the said place of supporting or guiding and binding engagement. The aperture may be bushed by any suitable material to increase the frictional engagement between the brake rod and the clip.

It is to be understood that the clip is not designed to, and does not, absolutely prevent the rotation of the brake-rod. The rod may have its rotational movement as given by the hand to set, or let off the brake, but its frictional bind is sufficient to retain the rod and connected parts in such position as they may be positively set.

The upper end of the brake-rod has its location near the saddle and is formed with the handle, or enlargement, $n'$, whereby it may be conveniently turned for operating the button-cam and consequently the brake levers.

While this brake is, up to a reasonable degree, efficient as an emergency brake its greatest advantage lies in its availability as a coasting brake, whereby, when set more or less hard, the hand pressure may be relieved from the brake rod without materially lessening the effective braking contact of the shoes upon the disk.

The brake disk and coacting brake levers and operating devices might be applied with relation to the front wheel, or the crank and sprocket shaft, the support of the levers and operating connections being correspondingly and suitably attained at any of the proper parts of the framing or fork.

The bearing by the brake shoes upon the disks, the one directly opposite the other, avoids any tendency to warp or distort the disk which, it is understood, is very thin and light.

Having thus described our invention, what we claim, and desire to secure by Letters Patent, is—

1. The combination with the wheel of a velocipede having the disk, of the brake-levers mounted to be swung to braking contact therewith, the button coacting with the brake-levers for setting them, a rod connected to the button for imparting the lever-forcing movement thereto, brake-levers, a clip encircling a suitable supporting part of the frame with an extension which is apertured for the reception closely therewithin of the rod and which is cleft at one side of, and intersecting the aperture, and the constricting screw, and all arranged substantially as described.

2. The combination with the wheel with the disk, of the levers, C, C, intermediately pivoted on a member of the frame near the disk and having opposing arms adjacent opposite sides of the disk, with the other pair of said arms diverging, a bar, or button, intermediately thereof pivotally supported by the frame and exerting a cam action to spread said diverging arms, a rod extended obliquely from the pivotal line of the said button to a place of convenient grasp by the rider and having a universal joint connection with said button, substantially as described and for the purposes set forth.

3. The combination with the wheel having the brake disk, of the levers pivotally mounted and adapted to exert brake-bearing contacts against opposite sides of the disk, a cam button pivotally mounted between arms of the levers for swinging them to their braking contacts, and means for swinging the button, and adjustable sections on the sides of the lever-arms next to the contacting portions of the cam buttons to be set up to compensate for wear of the brake, substantially as described.

4. The combination with the wheel having the brake disk, of the levers pivotally mounted and adapted to exert brake-bearing contacts against opposite sides of the disk, a clip, attached to a member of the frame adjacent the disk, which has a horizontal bracket extension, the button, and the vertical stud connected to the button and pivotally connected to the bracket, and the obliquely arranged brake-rod having a universal joint connection with the stud, substantially as described.

5. The combination with the wheel having the brake disk, of the levers pivotally mounted and adapted to exert brake-bearing contacts upon opposite sides of the disk, the cam button pivotally mounted between the levers and having facets on its working ends and a rod having a connection with said button for operating the brake, substantially as described.

JOEL H. HENDRICK.
ARTHUR H. FAY.

Witnesses:
 WM. S. BELLOWS,
 EDWARD P. HENDRICK.